United States Patent [19]
Fenske et al.

[11] 3,813,925
[45] June 4, 1974

[54] DETERMINATION OF THE TEMPERATURE REQUIRED FOR A PREDETERMINED VOLATILITY RATIO

[75] Inventors: Ellsworth R. Fenske, Palatine; James H. McLaughlin, La Grange, both of Ill.

[73] Assignee: Universal Oil Products Company, Des Plaines, Ill.

[22] Filed: July 6, 1972

[21] Appl. No.: 269,376

[52] U.S. Cl............ 73/64.2, 73/61.3, 137/3
[51] Int. Cl............ G01n 7/18, G01n 33/22
[58] Field of Search ........... 73/64.2, 61.3, 53, 36, 73/17 A; 137/3

[56] References Cited
UNITED STATES PATENTS

| | | | |
|---|---|---|---|
| 2,119,786 | 6/1938 | Kallam ........................ | 73/36 |
| 2,722,826 | 11/1955 | Milligan et al. ............... | 73/64.2 |
| 2,782,628 | 2/1957 | Jacobs et al. .................. | 73/64.2 |
| 3,145,561 | 8/1964 | Thompson ..................... | 73/64.2 |
| 3,440,865 | 4/1969 | Gamson ........................ | 73/61.3 |
| 3,491,585 | 1/1970 | Hass.............................. | 73/53 |
| 3,528,440 | 9/1970 | Plucker ......................... | 73/64.2 X |
| 3,686,924 | 8/1972 | Ludt et al. .................... | 73/53 |

Primary Examiner—Richard C. Queisser
Assistant Examiner—Joseph W. Roskos
Attorney, Agent, or Firm—James R. Hoatson, Jr.; Robert W. Erickson; William H. Page, II

[57] ABSTRACT

The temperature to which a liquid hydrocarbon feed stream must be heated to produce a given volume ratio of vapor produced to the original liquid is determined by monitoring the temperature of a vapor-liquid equilibrium formation zone. A constant rate of flow of the liquid to the zone is compared with the rate of flow of vapor from the zone, in which the temperature is adjusted until these rates are at the desired ratio.

7 Claims, 1 Drawing Figure

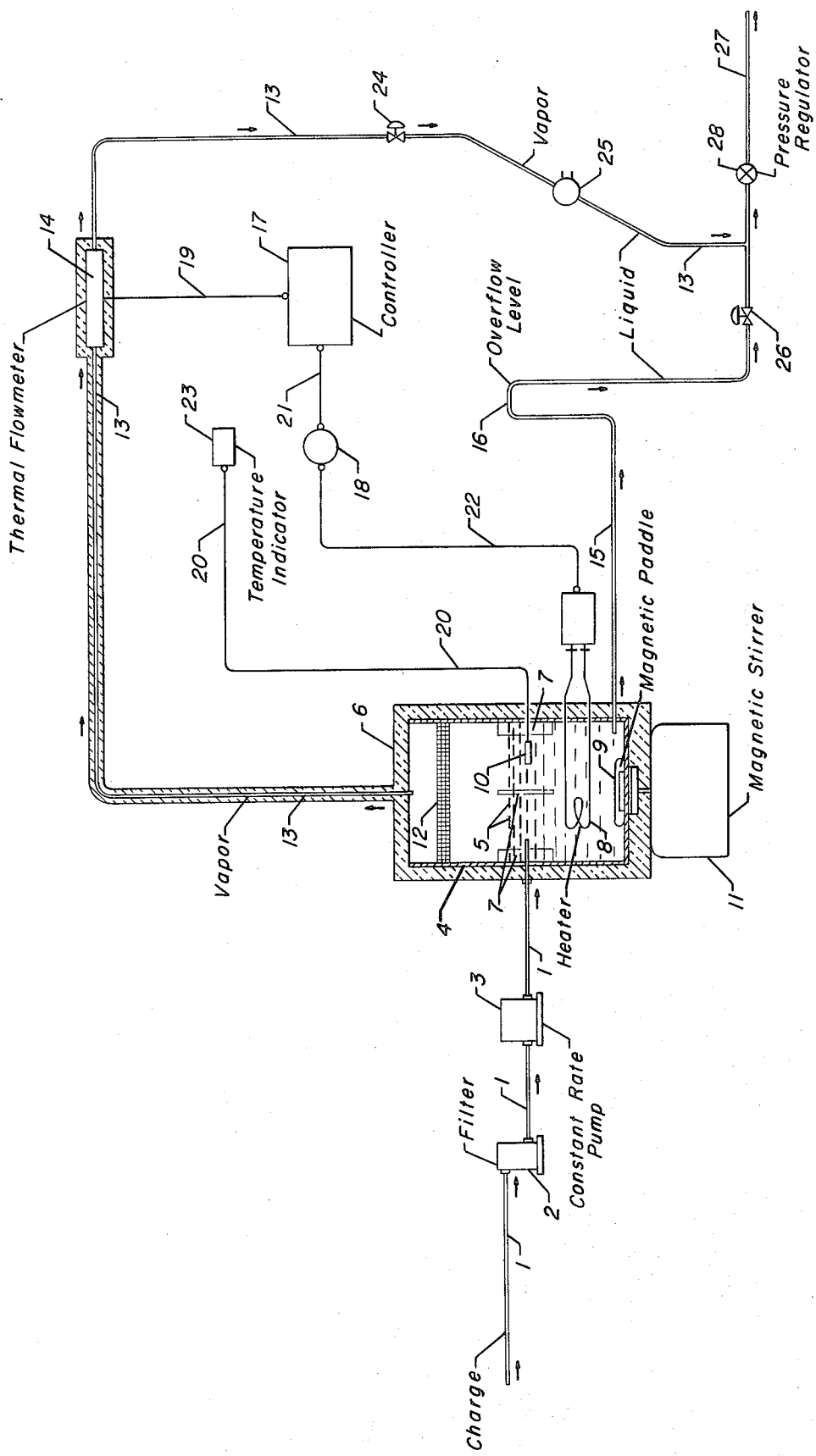

DETERMINATION OF THE TEMPERATURE REQUIRED FOR A PREDETERMINED VOLATILITY RATIO

BACKGROUND OF THE INVENTION

1. Field of the Invention

This invention relates to the measurement of vapor-liquid volume ratios of normally liquid hydrocarbon mixtures such as gasoline. It is specifically concerned with the determination of the temperature necessary to maintain a desired vapor-liquid ratio and the use of this information in adjusting the amount of butane added to a gasoline blend.

2. Description of the Prior Art

The temperature-vapor/liquid (V/L) volume ratio relationship correlates a fuel's volatility to its tendency to produce vapor lock in a vehicle. The tendency of a gasoline blend to cause vapor lock in typical passenger cars is indicated by the gasoline temperature necessary to produce V/L ratios of 20. The standards set for commercially sold gasoline are delineated in ASTM (American Society for Testing Materials) standard D439-70, p. 169–172 which specifies that the V/L ratio shall not exceed 20 at selected temperatures which vary from 105° F. to 140° F. depending on the intended sales location and season. ASTM Method D2533 in Part 17 of the *Annual Book of ASTM Standards* is the standard laboratory method for V/L ratio determination, but it is slow and not congruent with automated process control in modern refineries. The monetary benefits derivable from maintaining the V/L ratio as close to 20 as possible through the addition of relatively inexpensive but highly volatile refinery stocks such as butane has prompted development of means to determine the V/L ratio on a continuous basis. The approach has been to use a constant flow rate of charge through a constant temperature zone and to measure the resulting vapor flow given off (U.S. Pat. No. 3,491,585). This is in a sense the automation of the ASTM method. Pages 173 to 177 of ASTM Specification D439-70 provide methods to estimate the temperature at which the V/L ratio of particular gasoline blend will equal 20 from its Reid vapor pressure and 10, 20 and 50 per cent distillation temperatures.

SUMMARY OF THE INVENTION

The present invention determines the temperature at which the V/L ratio of a hydrocarbon mixture is 20, or any other specified number, by comparing the desired preset ratio with a measured ratio of the vapor formation rate to the charged liquid rate, and then adjusting the heat input into the vapor producing vapor-liquid equilibrium zone until the determined V/L ratio is that desired. The process comprises the steps of maintaining a fixed rate of charge liquid flow into a vapor-liquid equilibrium formation zone, measuring the rate of vapor formation, comparing this vapor rate to the liquid charge rate to determine the V/L ratio at the temperature of the vapor-liquid equilibrium zone, adjusting the temperature of the vapor-liquid equilibrium zone as needed to produce the desired V/L ratio, and monitoring the temperature of the vapor-liquid equilibrium zone.

DESCRIPTION OF THE DRAWING

The preferred embodiment of the invention is exemplified by the drawing, wherein a liquid hydrocarbon mixture shown entering the system by line 1 through filter 2 is pumped at a preset constant rate by pump 3 into a vapor-liquid equilibrium formation zone comprised of a vessel 4 surrounded by insulation 6, a baffle system 7, a heating coil 8, a magnetic agitator 9 rotated by drive means 11, a thermocouple 10 and a mist separator 12. The charged liquid hydrocarbon is mixed with residue hydrocarbon liquid mixture 5, the excess portion of which leaves by line 15 over over-flow level 16 and through one way valve 26. Vapor given off by the residue mixture 5, passes through mist separator 12 into insulated and heated line 13 to thermal flow meter 14, one way valve 24 and cooler 25 where it is condensed to a liquid and mixed with excess residue liquid from line 15 at the entrance to line 27 prior to release through pressure regulation means 28. The vapor flow rate determined by thermal flow meter 14 is relayed to controller 17 by means 19 which compares this rate to a preset optimum based on the liquid charge rate and by means 21 adjusts electrical power supply 18 which by means 22 supplies electrical energy to heater element 8 to adjust the temperature of the residue liquid 5. This temperature is relayed from thermocouple 10 by means 20 to indicator 23.

This drawing and description of the preferred embodiment are not intended to place any limitation on the invention and are meant as examples only. Modifications and additions as are obvious to those skilled in the art may be beneficial to the utilization of this invention are included within the scope of this invention.

DETAILED DESCRIPTION OF THE INVENTION

The invention is a process for determining the temperature at which a mixture of hydrocarbons will have a predetermined ratio of the quantity of vapor formed to the quantity of the original liquid. Due to the great multitude of organic compounds found in any natural petroleum fraction, such as gasoline, and the difficulty of determining the identity and concentration of each component, it is from an economic standpoint impractical to determine this temperature except by direct experimental measurement or through estimation from boiling point characteristics of the mixture. As previously mentioned, there are ASTM standard methods to determine the V/L (vapor-liquid), ratio at various temperatures and established methods for the estimation of this ratio. The economic importance of this ratio rests in its use as a specification for the quality of gasoline sold in this country by limiting its tendency to cause vapor lock in automotive engines. A V/L ratio of 20 has been chosen as the standard and the temperature at which the V/L ratio of a gasoline equals 20 is used as the grading system for volatility. The temperature specified is based on expected ambient temperatures in the area of use and ranges from 140° F. in hot weather zone or season to 105° F. in a cold weather zone.

The V/L ratio of a gasoline blend is generally controlled by regulating its butane content. Light streams, particularly butane, are worth more as gasoline components than as fuel gas or charge stock for petrochemical processing. Therefore, the ability to closely control the blending of as much light material as practical into a gasoline is desired by refiners.

Determining the V/L ratio of a gasoline blend by a static method is slow and therefore not the optimum procedure in a refinery producing large quantities that may be constantly changing in composition due to varying processing conditions and where reblending may not be practical. It is highly desirable to have available a means for quick determination of the V/L ratio and automatic adjustment of the addition of various streams. The prior art shows how this can be accomplished by determination of the vapor-liquid ratio of the blend at a set preselected temperature and by corresponding adjustment of the blend composition based on this experimentally determined ratio. The preferred embodiment of this invention adjusts the blend composition of a gasoline according to a determination of the temperature to which the blend must be heated to produce the V/L ratio desired. In the preferred embodiment, gasoline, or any other mixture of hydrocarbons, is if necessary filtered and then pumped at a known rate in a vapor liquid equilibrium zone designed to establish a vapor liquid equilibrium mixture. The liquid charge rate used in the preferred embodiment is about one milliliter per minute due to the nature of the vapor flow rate measurement apparatus. Thie equilibrium zone may be a packed column, a falling film evaporator or any means of providing sufficient liquid surface and circulation to produce a very close approximation to a true vapor-liquid equilibrium. The zone may be constructed in one of several designs; a once through-large area zone such as a falling film evaporator, a small contact area-long residence time zone such as a distillation flask or tray, or any combination of these two. The large area zone will usually allow passage of most of the liquid from the zone shortly after its entrance, while the small area zone will have a method of maintaining a sizeable quantity of the liquid, such as an over flow opening. Although the large area equilibrium formation zones may provide a quicker approach to an equilibrium condition after a change in charge liquid composition they do present temperature control problems. The placement of a heating element in the agitated liquid itself provides a fast and simple method of controlling the temperature of the mixture. The equilibrium zone should be well insulated and constructed of a low heat capacity material to increase the response of the zone to a small change in heat input.

The embodiment shown in the drawing is not meant in any way to limit the claimed invention to such a construction with specific features such as a magnetic stirring means or baffles on the walls of the container, etc. Agitation can be provided by any other feasible means such as a common mixing blade or a forced circulation system. The baffles are shown as a means to promote rapid mixing of the fresh charge with the residue liquid and as a method to increase turbulence, liquid surface area and contact between the liquid phase and gas phase. The electric heating element shown could be replaced by an external heat source or any method such as a liquid heat bath to regulate the separation zone's temperature. The temperature control unit and heating means must be sensitive to within at least ±1° F. and preferably to within ±0.1° F. Although it is not shown, a cooling means could also be installed in the apparatus to make possible a faster cooling rate than that due to the charged liquid.

Vaporized hydrocarbons flowing from the separation zone should be conducted through a heated tube to prevent condensation. The vapor flow can be measured by any practical means such as the thermal electric flowmeter (TEF) shown, or if the rate is sufficient an orifice. The vapor rate must be compensated for any volume change due to the temperature difference between the rate measurement means and standard temperature and pressure conditions. After measurement, the vapor can be condensed to a liquid and recombined with the excess residue liquid from the separation zone. The recombination of these two streams makes only one pressure regulation system necessary. Since it will be used in conjunction with a liquid, it need only be something as simple as a spill-over adjusted to provide the desired pressure, which is usually one atmosphere. A back pressure valve or a pressure control system are more sophisticated examples of suitable pressure control system.

In operation, if the V/L ratio determined by the controller is less than that desired, the controller will increase the heat input into the separation zone thereby increasing the amount of vaporization and the V/L ratio. Likewise, if the V/L ratio is too high the controller will allow the separation zone to cool down. The temperature at which the V/L ratio of the gasoline will be equal to 20 or any other number is therefore obtained simply by monitoring the temperature of the separation zone after the system has come to a steady state condition. This temperature is then compared with the selected standard temperature for the desired volatility grade of the gasoline. Based on the present ASTM standard the selected temperature will be one of the following: 105° F., 116° F., 124° F., 133° F., or 140° F.

It is a simple matter to convert any difference between these two temperatures into a requirement to increase or decrease the amount of butanes added. An indicated temperature above the specified standard means that more highly volatile light material should be added to increase the volatility of the resulting blend. This will result in the indicated required temperature dropping. This blending procedure is well suited to automatic computer control, especially since other factors besides the V/L ratio are very important to the determination of optimum gasoline blend ingredients. One of the most important of these is the octane number which would decrease with the addition of greater amounts of low octane light material. Therefore, this invention can be increased in utility if it is interconnected with an automatic octane monitor to provide simultaneous compensating adjustment for both qualities. If an additional amount of light material is needed, the amount of higher octane components needed in the blend would also be increased. This adjustment can be performed rapidly with a digital or analog computer programmed to select a blend having a minimum cost but still meeting all specifications. The relative volatility of high octane blend materials such as alkylate or reformate should be balanced against their respective cost and octane numbers prior to any change in blend composition.

We claim as our invention:

1. In a process for controlling the amount of highly volatile hydrocarbon material added to a gasoline blend to maintain its vapor/liquid ratio at a preset value at a selected temperature, operated by:
   a. maintaining a known rate of flow of blended gasoline into a vapor-liquid equilibrium zone;
   b. measuring the rate of formation of vapor in the vapor-liquid equilibrium zone;
   c. dividing the vapor formation rate by the known rate at which gasoline is charged to the vapor-liquid equilibrium zone to determine a measured vapor/liquid ratio of the gasoline blend at the temperature of the equilibrium zone;

d. comparing the measured vapor/liquid ratio of the gasoline blend at the temperature of the vapor-liquid equilibrium zone to said preset value;

the improvement for controlling the amount of highly volatile hydrocarbon material added to the gasoline blend to maintain the gasoline blend vapor/liquid ratio at the preset value at the temperature selected which comprises e. automatically adjusting the temperature of the vapor-liquid equilibrium zone to maintain the measured vapor/liquid ratio of the gasoline blend at a value equal to said preset vapor/liquid ratio value;

f. automatically computing the difference between the temperature of the vapor-liquid equilibrium zone obtained in step (e) and said selected temperature; and, g. adjusting the amount of highly volatile hydrocarbon material added to the gasoline blend in a manner designed to maintain said difference in temperature at a zero value.

2. The process of claim 1 wherein the mixture of liquid hydrocarbons charged to the process comprises a mixture which is less than 10 per cent distillable at 105° F. and more than 90 per cent distillable at 400° F.

3. The process of claim 1 wherein the vapor-liquid separating zone comprises a falling film evaporator.

4. The process of claim 1 wherein the vapor-liquid separating zone comprises an agitated pool of liquid with a heating means located in said vapor-liquid separating zone.

5. The process of claim 1 wherein the preset value of the vapor-liquid ratio is equal to 20.

6. A process for automated optimization of the vapor/liquid ratio and the octane number of a gasoline blend in which the vapor/liquid ratio is maintained at a preset value at any selected temperature which comprises the steps of:

a. maintaining a known rate of flow of blended gasoline into a vapor-liquid equilibrium zone;

b. measuring the rate of formation of vapor in the vapor-liquid equilibrium zone;

c. dividing the vapor formation rate by the known rate at which gasoline is charged to the vapor-liquid equilibrium zone to determine a measured vapor/liquid ratio of the gasoline blend at the temperature of the equilibrium zone;

d. comparing the measured vapor/liquid ratio of the gasoline blend at the temperature of the vapor-liquid equilibrium zone to said preset value;

e. adjusting the temperature of the vapor-liquid equilibrium zone to maintain the measured vapor/liquid ratio of the gasoline blend at a value equal to said preset vapor/liquid ratio value;

f. comparing the temperature of the vapor-liquid equilibrium zone obtained in step (e) to said selected temperature;

g. monitoring the octane number of the gasoline blend;

h. making simultaneous compensating adjustments to the amount of butane added to the gasoline blend to control the V/L ratio and the amount of high octane components added to the gasoline blend to control the octane number.

7. The process of claim 6 wherein the preset value of the vapor/liquid ratio is equal to 20.

* * * * *